US011910474B1

(12) United States Patent
Badar et al.

(10) Patent No.: US 11,910,474 B1
(45) Date of Patent: Feb. 20, 2024

(54) IMS SELECTION FOR MULTI-HSS ROUTE ADVANCE

(71) Applicant: T-Mobile USA, Inc., Bellevue, WA (US)

(72) Inventors: Saqib Badar, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 373 days.

(21) Appl. No.: 17/189,880

(22) Filed: Mar. 2, 2021

(51) Int. Cl.
| | |
|---|---|
| *H04W 8/04* | (2009.01) |
| *H04W 60/00* | (2009.01) |
| *H04W 8/24* | (2009.01) |
| *H04L 65/1016* | (2022.01) |
| *H04L 61/4511* | (2022.01) |
| *H04L 65/1045* | (2022.01) |
| *H04L 65/1104* | (2022.01) |

(52) U.S. Cl.
CPC ........... *H04W 8/04* (2013.01); *H04L 61/4511* (2022.05); *H04L 65/1016* (2013.01); *H04L 65/1045* (2022.05); *H04L 65/1104* (2022.05); *H04W 8/24* (2013.01); *H04W 60/005* (2013.01)

(58) Field of Classification Search
CPC ....... H04W 8/04; H04W 8/24; H04W 60/005; H04L 65/1104; H04L 65/1045; H04L 61/4511; H04L 65/1016
See application file for complete search history.

(56) References Cited

U.S. PATENT DOCUMENTS

| | | | |
|---|---|---|---|
| 8,782,208 B2 * | 7/2014 | Belinch Vergara | ......................... H04L 65/1016 709/227 |
| 2006/0030320 A1 * | 2/2006 | Tammi ................ | H04L 65/1104 455/435.2 |
| 2007/0072605 A1 | 3/2007 | Poczo | |
| 2007/0086582 A1 | 4/2007 | Tai et al. | |
| 2007/0275710 A1 * | 11/2007 | Mayer ..................... | H04L 69/40 455/423 |
| 2010/0217875 A1 * | 8/2010 | Belinchon Vergara | ..................... H04L 65/1104 709/228 |
| 2011/0255550 A1 * | 10/2011 | Ye ......................... | H04W 60/00 370/401 |

(Continued)

OTHER PUBLICATIONS

Office Action for U.S. Appl. No. 16/707,686, dated Apr. 13, 2022, Badar, "Local IMS Selection for Trusted Network Operators", 22 pages.

(Continued)

*Primary Examiner* — Khaled M Kassim
(74) *Attorney, Agent, or Firm* — Lee & Hayes, P.C.

(57) ABSTRACT

In a multi-HSS domain, in which some HSSs support a custom route advance (RA) logic and others do not, a P-CSCF may receive a request for service from a UE associated with one of the HSSs, and send the request to an assigned S-CSCF (S-CSCF1) associated with the UE. Upon failing to receive a response from the S-CSCF1 within a preset time period, the P-CSCF may send the request to the I-CSCF. Based on information included in the request, the I-CSCF may discover an address of a second S-CSCF (S-CSCF2) from the associated HSS and sending the request to the S-CSCF2 based on the discovered address of the S-CSCF2, or send a message indicative of the requested service being unavailable to the P-CSCF.

20 Claims, 6 Drawing Sheets

(56) References Cited

U.S. PATENT DOCUMENTS

| | | | |
|---|---|---|---|
| 2013/0097330 A1* | 4/2013 | Qiu | H04L 12/6418 |
| | | | 709/228 |
| 2014/0092853 A1* | 4/2014 | Noldus | H04L 65/1016 |
| | | | 370/329 |
| 2014/0192773 A1* | 7/2014 | Austrell | H04L 65/1073 |
| | | | 370/331 |
| 2015/0282242 A1* | 10/2015 | Merino Vazquez | H04W 76/19 |
| | | | 370/221 |
| 2018/0324224 A1 | 11/2018 | Merino Vazquez et al. | |
| 2021/0176634 A1 | 6/2021 | Badar et al. | |
| 2023/0117864 A1* | 4/2023 | Miao | H04W 8/04 |
| | | | 370/329 |

OTHER PUBLICATIONS

Office Action for U.S. Appl. No. 16/707,686, dated Aug. 1, 2022, Badar, U.S. Appl. No. 16/707,686, 23 pages.

* cited by examiner

IMS SELECTION FOR MULTI-HSS ROUTE ADVANCE

BACKGROUND

Modern telecommunications systems include heterogeneous mixtures of second, third, fourth, and fifth generation (2G, 3G, 4G, and 5G) cellular-wireless access technologies, which can be cross-compatible and can operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies. As increased capabilities of user equipment (UE) enable greater data consumption, placing increased demands on networks, the 5G telecommunication technologies are designed to combine both an evolution and revolution of the existing LTE/LTE-A mobile networks to provide a much higher connectivity, greater throughput, much lower latency, and ultra-high reliability to support new use cases and applications.

The modern telecommunications systems also include Internet Protocol (IP) Multimedia Subsystems (IMSs) for delivering IP multimedia services, which may be used to set up communications between IMS systems supported by different communication network providers. While a route advance (RA) for a serving call session control function (S-CSCF) selection logic may be utilized, when an initial S-CSCF is not available, to select another S-CSCF, the route advance may not always be appropriate in various service logic handling in a communication network with multi-home subscriber service (HSS) route advance (RA).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A method, device, and system disclosed herein are directed to selecting, by an interrogating CSCF (I-CSCF), a second service call session control function (S-CSCF2) when an assigned, or a first, S-CSCF (S-CSCF1) to which a UE is registered, is unable to respond, based on capabilities required for the S-CSCF2 learned from a home subscriber server (HSS) associated with the UE and a custom route advance (RA) logic supported by the HSS.

In modern cellular communication networks, IP Multimedia Subsystems (IMSs) are utilized to deliver IP multimedia services to user equipment (UEs). In a multi-home subscriber server (HSS) domain, a call session control function (CSCF) may interact with multiple HSSs, of which some HSSs support a custom route advance (RA) logic and others do not. For example, a first UE may be associated with a first HSS that supports a custom RA logic and a second UE may be associated with a second HSS that does not support a custom RA logic while both the first UE and the second UE may have a commonly assigned serving CSCF. However, if the assigned serving-CSCF (S-CSCF1) experiences some issues, the S-CSCF1 may fail to properly respond to an INVITE from the UE via a proxy CSCF (P-CSCF), or simply time out without the P-CSCF receiving a response. If the P-CSCF fails to receive a response from the S-CSCF1 within a preset time period, the P-CSCF may send an INVITE to an interrogating-CSCF (I-CSCF), which may discover the address of another S-CSCF (S-CSCF2) for the UE via a location-info-request (LIR) and a location-info-answer (LIA) message exchange with the HSS associated with the UE based on a custom RA logic associated the INVITE, which may be the first or the second HSS depending on the UE, and send the INVITE to the S-CSCF2 based on the address of the S-CSCF2 obtained from the HSS.

The I-CSCF may determine whether a custom RA logic is supported by the HSS associated with the UE based on an RA flag associated with the Invite. If the custom RA logic is not supported, for example, the UE is associated with the second HSS, the I-CSCF may send a message indicative of the requested service being unavailable to the P-CSCF. If the custom RA logic is supported, for example, the UE is associated with the first HSS, the I-CSCF may discover the address of the S-CSCF2 for the UE, that is compatible or appropriate for the services and/or subscriptions of the UE, via the LIR/LIA message exchange with the HSS, and send the INVITE to the S-CSCF2. The S-CSCF2 may then communicate with the HSS utilizing a service assignment request (SAR) and a service assignment answer (SAA) indicating that the S-CSCF2 is now serving the UE.

Figure 1:
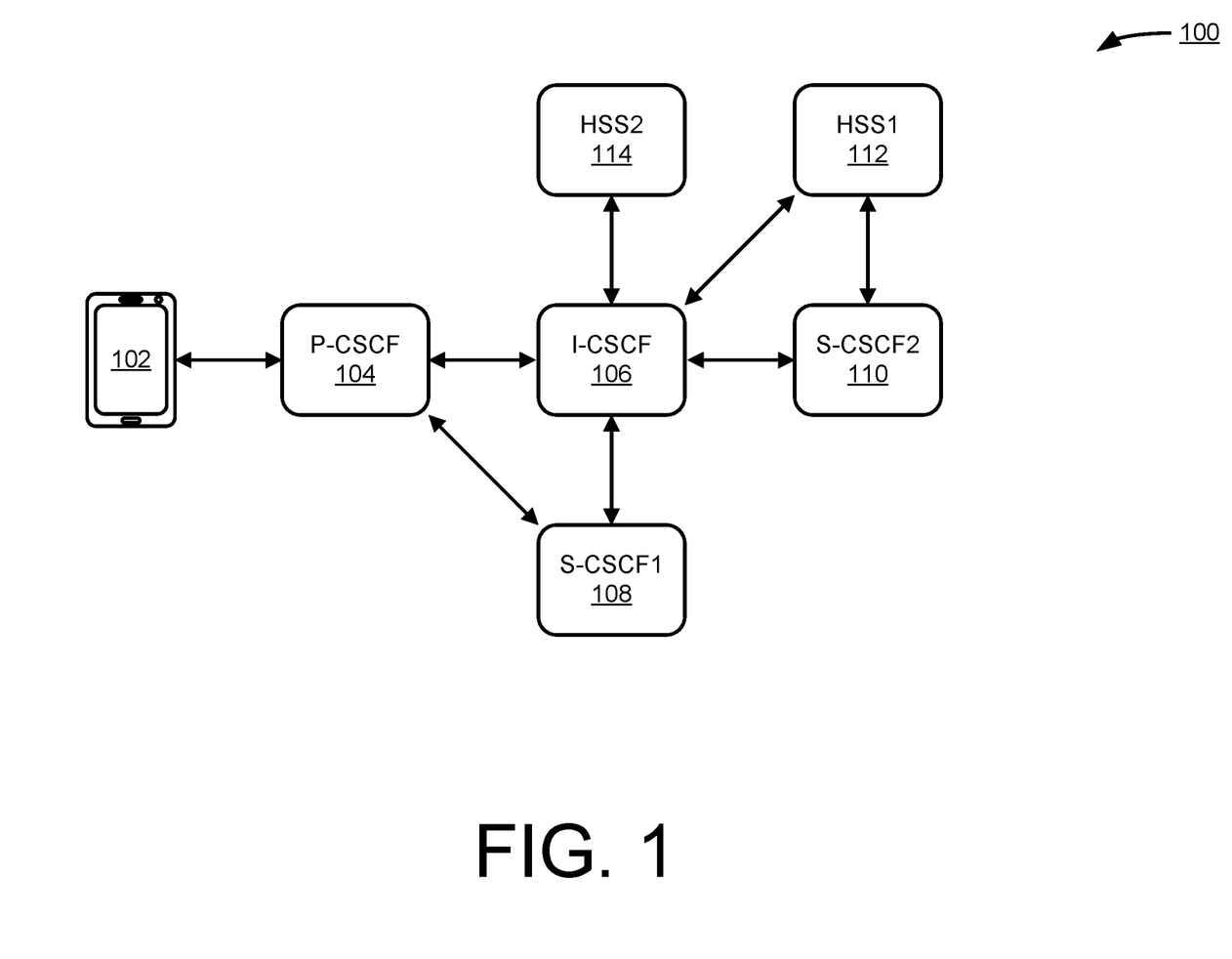
FIG. 1 illustrates an example cellular communication network supporting multi-HSS RA.

FIG. 1 illustrates an example cellular communication network 100 supporting multi-HSS RA. The cellular communication network may comprise a UE 102, a P-CSCF 104, an I-CSCF 106, a first S-CSCF (S-CSCF1) 108, a second S-CSCF (S-CSCF2) 110, a first HSS (HSS1) 112, which supports a custom RA logic, and a second HSS (HSS2) 114, which does not support a custom RA logic. The cellular communication network 100 may include other components and functional elements (not shown) in addition to those described above. Functions of each components above and communications among the components will be described in conjunction with an example process described below.

Figure 2:
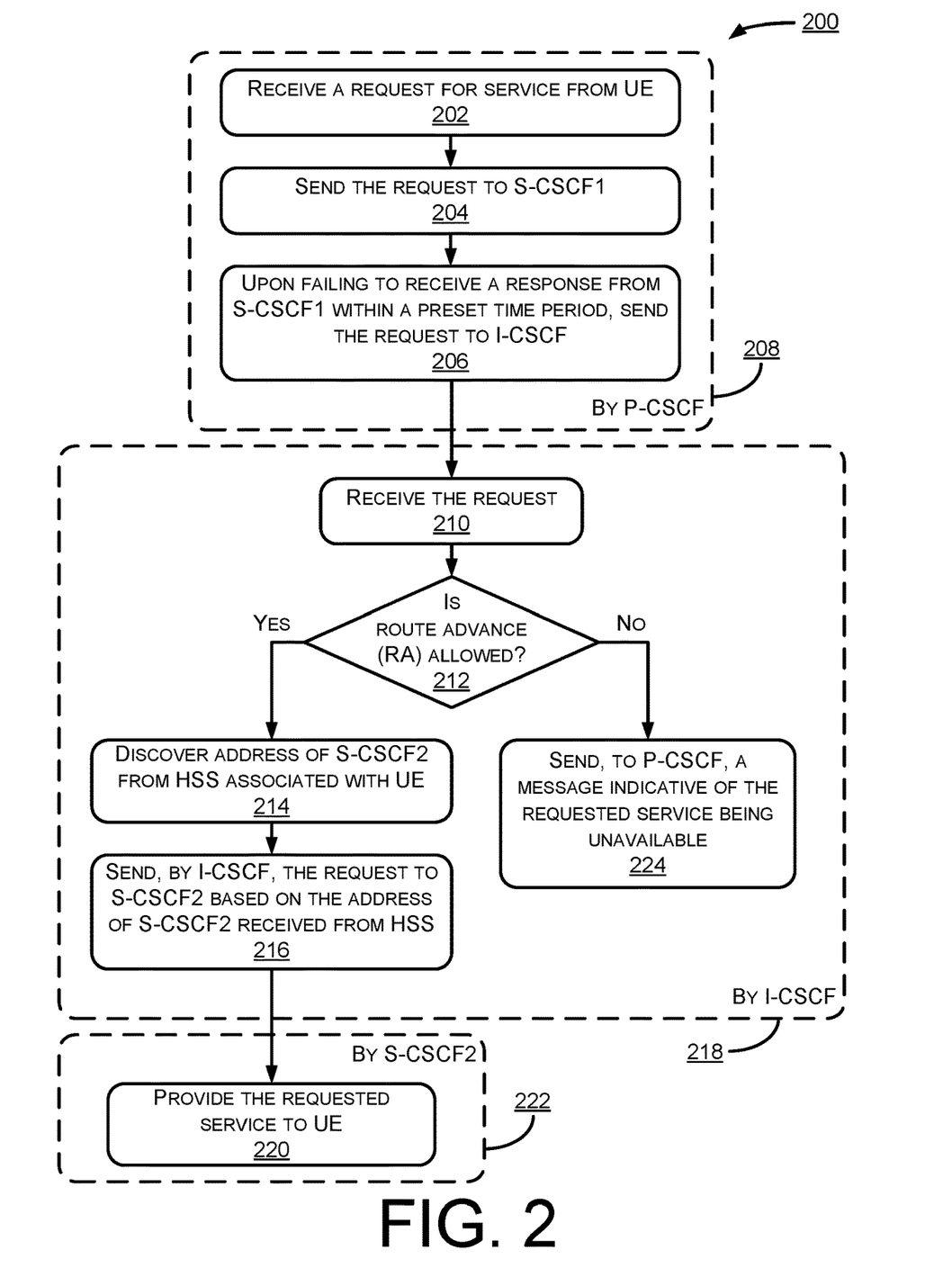
FIG. 2 illustrates an example process in the cellular communication network for managing a requested service when an assigned S-CSCF fails to respond to a request.

FIG. 2 illustrates an example process 200 in the cellular communication network 100 for managing a requested service when a first, or an assigned, S-CSCF fails to respond to a request.

At block 202, the P-CSCF 104 may receive a request, which may be in a form of a SIP INVITE message, for service from the UE 102. The INVITE may be associated with one of multimedia telephony (MMTEL), short message session initiation protocol (SMSIP), the UE 102 being on 5G access or 3G access type, or subscription for the UE 102. At block 204, in response to receiving the INVITE, the P-CSCF 104 may send, or forward, the INVITE to the S-CSCF1 108, which is the assigned S-CSCF, i.e., the first S-CSCF for the P-CSCF 104 to contact in response to receiving the INVITE from the UE 102 irrespective of whether the UE is associated with a HSS that supports a custom RA logic. In a normal situation, the S-CSCF1 108 may send a response back to the P-CSCF 104, however, if the S-CSCF1 108 were experiencing some issues internally and unable to respond or externally and did not receive the INVITE, the S-CSCF1 108 may not, or may not be able to, respond to the INVITE. At block 206, upon failing to receive a response from the S-CSCF1 108 within a preset time period, the P-CSCF 104 may send the INVITE to the I-CSCF 106. As described above and shown as a dotted line 208, blocks 202, 204, and 206 may substantially be performed by the P-CSCF 104.

At block 210, the I-CSCF 106 may receive the INVITE from the P-CSCF 104 and may determine whether a route advance (RA) is allowed or supported based on information included in the INVITE at block 212. For example, the I-CSCF 106 may determine that the information included in the request comprises an RA flag and that a feature tag associated with the request is consistent with a custom RA logic associated with the RA flag. The UE 102, if associated the HSS1 112 capable of managing an RA logic, may automatically add the RA flag and the feature tag to the INVITE when sending the INVITE to the P-CSCF 104. Alternatively, the P-CSCF 104 may automatically add the RA flag and the feature tag associated with the UE 102 to the INVITE when sending the INVITE to the I-CSCF 106 at block 206. The I-CSCF 106 may then proceed to block 214 to discover the address of the S-CSCF2 110 from the HSS1 112, which supports a custom RA logic.

At block 214, the I-CSCF 106 may initiate a location-info-request (LIR) and a location-info-answer (LIA) messages between the I-CSCF 106 and the associated HSS 112 based on the custom RA logic associated with the RA flag. The LIR/LIA messages may include a reassignment pending flag and a request type as "Registration and Capability" that indicates to the HSS1 112 that the HSS1 112 has to return the mandatory capabilities, and not the assigned S-CSCF, i.e., the S-CSCF1 108 in this example. The HSS1 112 may then respond with mandatory capabilities based on the I-CSCF 106 performing full qualified domain name (FQDN) resolution to determine another S-CSCF, which is the S-CSCF2 110 in this example. Based on the address of the S-CSCF2 110 determined at 214, which may be in a form of an FQDN associated with the S-CSCF2 110, the I-CSCF 106 may send the INVITE to the S-CSCF2 110 at 216. As described above and shown as a dotted line 216, blocks 210, 212, 214, and 216 may substantially be performed by the I-CSCF 106.

At 220, the S-CSCF2 110 may communicate with the HSS1 112 utilizing a service assignment request (SAR) and a service assignment answer (SAA) indicating that the S-CSCF2 110 is now serving the UE 102, and download a user profile associated with the UE 102 from the HSS1 112. The S-CSCF2 110 may send an SAR with assignment type as No_Assignment requesting the data of the user initial filter criteria (iFCs) from the HSS1 112, and the HSS1 112 may replace the assigned S-CSCF, the S-CSCF1 108 as the S-CSCF2 110 for the UE 102 and respond with the iFC. As described above and shown as a dotted line 222, block 220 may substantially be performed by the S-CSCF2 110.

The I-CSCF 106 may determine whether a custom RA logic is supported based on information learned from the HSS1 112, an RA flag, a lack of the RA flag, and a feature tag indicative of service, access, method, or Cx realm type associated with the INVITE. Alternatively, the I-CSCF 106 may determine that the custom RA logic is not supported along with discovering the address of the S-CSCF1 108 if the UE 102 is associated with the HSS2 114, which is known not to support the custom RA logic.

For example, a multi-HSS RA according to the service type may be based on a multimedia telephony (MMTEL) feature tag and Cx realm I-CSCF logic for RA such that an INVITE associated with MMTEL may have an RA flag indicating the custom RA logic is supported while an INVITE associated with a short message session initiation protocol (SMSIP) may have an RA flag indicating the custom RA logic is not supported. A multi-HSS RA according to the access type may be based on a private access network information PANI for new radio (PANI(NR)) and Cx realm I-CSCF logic for RA such that an INVITE associated with 5G access may have an RA flag indicating the custom RA logic is supported while an INVITE associated with a 3G access may have an RA flag indicating the custom RA logic is not supported. A multi-HSS RA according to the method type may be based on a method type and Cx realm I-CSCF logic for RA such that an INVITE associated with MMTEL may have an RA flag indicating the custom RA logic is supported while an INVITE associated with subscription may have an RA flag indicating the custom RA logic is not supported. A multi-HSS RA according to the Cx realm type may be based on a Cx realm based I-CSCF logic for RA such that an INVITE associated with MMTEL from a UE associated with the HSS1 112 may have an RA flag indicating the custom RA logic is supported while an INVITE associated with a UE associated with the HSS2 114 may have an RA flag indicating the custom RA logic is not supported.

At block 212, if the I-CSCF 106 determines that the RA is not allowed or supported as described above, then the I-CSCF 106 may send the 480 SIP message to the P-CSCF 104 at block 224. In addition, the I-CSCF 106 may determine that the RA is not allowed or supported based on the LIR/LIA messages. Instead of returning the mandatory capabilities as described above with reference to block 214 with an alternative S-CSCF, the HSS1 112, or HSS2 114, may return the assigned S-CSCF, in this example, the assigned S-CSCF is the S-CSCF 1 108, indicating that the RA is not supported.

Figure 3:
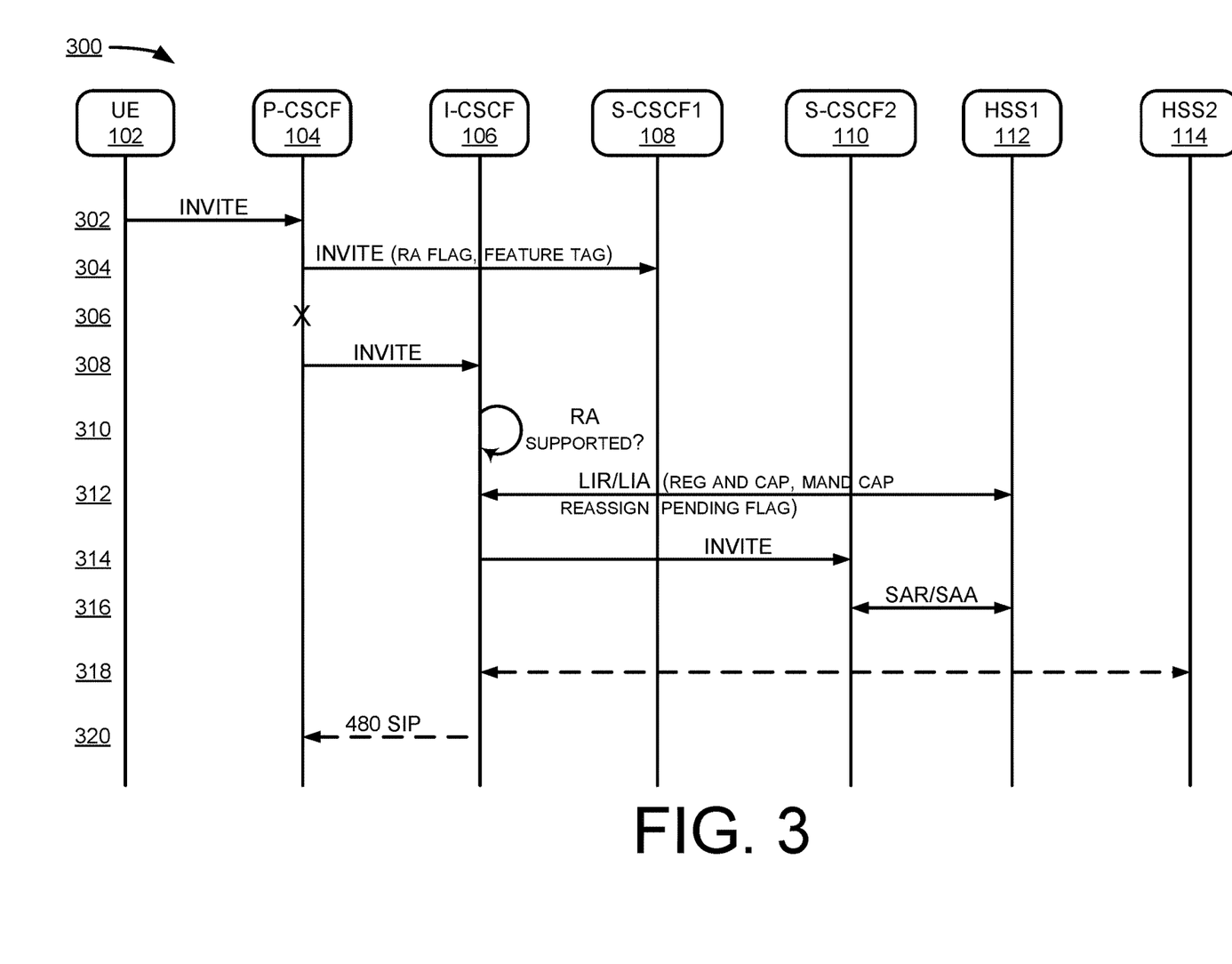
FIG. 3 illustrates an example communication sequence diagram for managing a requested service when a first, or an assigned, S-CSCF fails to respond to a request in the cellular communication network.

FIG. 3 is a communication sequence diagram 300 illustrating an example communication sequence for managing a requested service when a first, or an assigned, S-CSCF 108 fails to respond to a request in the cellular communication network 100.

In FIG. 3, communicating components or entities are listed along the top, with a corresponding vertical line extending downward. Communications are indicated by arrows that extend horizontally from and to the vertical lines corresponding to the entities from that originate and receive the communications. Communications occur in order from top to bottom. An individual communication or set of communications is indicated by a corresponding reference numeral along the left side of the figure, horizontally aligned with the arrow or arrows representing the communication. FIG. 3 illustrates the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown.

At 302, the P-CSCF 104 may receive a request, which may be in a form of a SIP INVITE message, for service from the UE 102. The INVITE may be associated with one of multimedia telephony (MMTEL), short message session initiation protocol (SMSIP), the UE 102 being on 5G access or 3G access type, or subscription for the UE 102. At 304, in response to receiving the INVITE, the P-CSCF 104 may send, or forward, the INVITE to the S-CSCF1 108, which is the assigned S-CSCF, i.e., the first S-CSCF for the P-CSCF 104 to contact in response to receiving the INVITE from the UE 102 irrespective of whether the UE is associated with a HSS that supports a custom RA logic. In a normal situation, the S-CSCF1 108 may send a response back to the P-CSCF 104, however, if the S-CSCF1 108 were experiencing some issues internally and unable to respond or externally and did not receive the INVITE, the S-CSCF1 108 may not, or may not be able to, respond to the INVITE. At 306, a preset time period within which the P-CSCF 104 is expected to receive a response from the S-CSCF1 108 is shown to have expired, and the P-CSCF 104 may send the INVITE to the I-CSCF 106 at 308.

At 310, in response to receiving the INVITE from the P-CSCF 104, the ICSCF 106 may determine whether a route advance (RA) is allowed or supported based on information included in the INVITE. For example, the I-CSCF 106 may determine that the information included in the request comprises an RA flag and that a feature tag associated with the request is consistent with a custom RA logic associated with the RA flag. The UE 102, if associated the HSS1 112 capable of managing an RA logic, may automatically add the RA flag and the feature tag to the INVITE when sending the INVITE to the P-CSCF 104. Alternatively, the P-CSCF 104 may automatically add the RA flag and the feature tag associated with the UE 102 to the INVITE when sending the INVITE to the I-CSCF 106 at block 206. The I-CSCF 106 may then proceed to block 214 to discover the address of the S-CSCF2 110 from the HSS1 112, which supports a custom RA logic.

At 312, the I-CSCF 106 may initiate LIR/LAR messages with the HSS1 112 based on the custom RA logic associated with the RA flag. The LIR/LIA messages may include a reassignment pending flag and a request type as "Registration and Capability" that indicates to the HSS1 112 that the HSS1 112 has to return the mandatory capabilities, and not the assigned S-CSCF, i.e., the S-CSCF1 108 in this example. The HSS1 112 may then respond with mandatory capabilities based on the I-CSCF 106 performing full qualified domain name (FQDN) resolution to determine another S-CSCF, which is the S-CSCF2 110 in this example. Based on the address of the S-CSCF2 110 determined at 312, which may be in a form of an FQDN associated with the S-CSCF2 110, the I-CSCF 106 may send the INVITE to the S-CSCF2 110 at 314.

At 316, the S-CSCF2 110 may communicate with the HSS1 112 utilizing SAR/SAA messages indicating that the S-CSCF2 110 is now serving the UE 102, and download a user profile associated with the UE 102 from the HSS1 112. The S-CSCF2 110 may send an SAR with assignment type as No_Assignment requesting the data of the user initial filter criteria (iFCs) from the HSS1 112, and the HSS1 112 may replace the assigned S-CSCF, the S-CSCF1 108 as the S-CSCF2 110 for the UE 102 and respond with the iFC.

The I-CSCF 106 may determine whether a custom RA logic is supported based on information learned from the HSS1 112, an RA flag, a lack of the RA flag, and a feature tag indicative of service, access type, method, or Cx realm type associated with the INVITE. Alternatively, the I-CSCF 106 may determine that the custom RA logic is not supported along with discovering the address of the S-CSCF1 108 if the UE 102 is associated with the HSS2 114, which is known not to support the custom RA logic as shown as an dotted arrow line 318.

For example, a multi-HSS RA according to the service type may be based on a multimedia telephony (MMTEL) feature tag and Cx realm I-CSCF logic for RA such that an INVITE associated with MMTEL may have an RA flag indicating the custom RA logic is supported while an INVITE associated with a short message session initiation protocol (SMSIP) may have an RA flag indicating the custom RA logic is not supported. A multi-HSS RA according to the access type may be based on a private access network information PANI for new radio (PANI (NR)) and Cx realm I-CSCF logic for RA such that an INVITE associated with 5G access may have an RA flag indicating the custom RA logic is supported while an INVITE associated with a 3G access may have an RA flag indicating the custom RA logic is not supported. A multi-HSS RA according to the method type may be based on a method type and Cx realm I-CSCF logic for RA such that an INVITE associated with MMTEL may have an RA flag indicating the custom RA logic is supported while an INVITE associated with subscription may have an RA flag indicating the custom RA logic is not supported. A multi-HSS RA according to the Cx realm type may be based on a Cx realm based I-CSCF logic for RA such that an INVITE associated with MMTEL from a UE associated with the HSS1 112 may have an RA flag indicating the custom RA logic is supported while an INVITE associated with a UE associated with the HSS2 114 may have an RA flag indicating the custom RA logic is not supported.

At block 310, if the I-CSCF 106 determines that the RA is not allowed or supported as described above, then the I-CSCF 106 may send the 480 SIP message to the P-CSCF 104 at 320. In addition, the I-CSCF 106 may determine that the RA is not allowed or supported based on the LIR/LIA messages. Instead of returning the mandatory capabilities as described above with reference to 312 with an alternative S-CSCF, the HSS1 112, or HSS2 114, may return the assigned S-CSCF, in this example, the assigned S-CSCF is the S-CSCF1 108, indicating that the RA is not supported.

Figure 4:
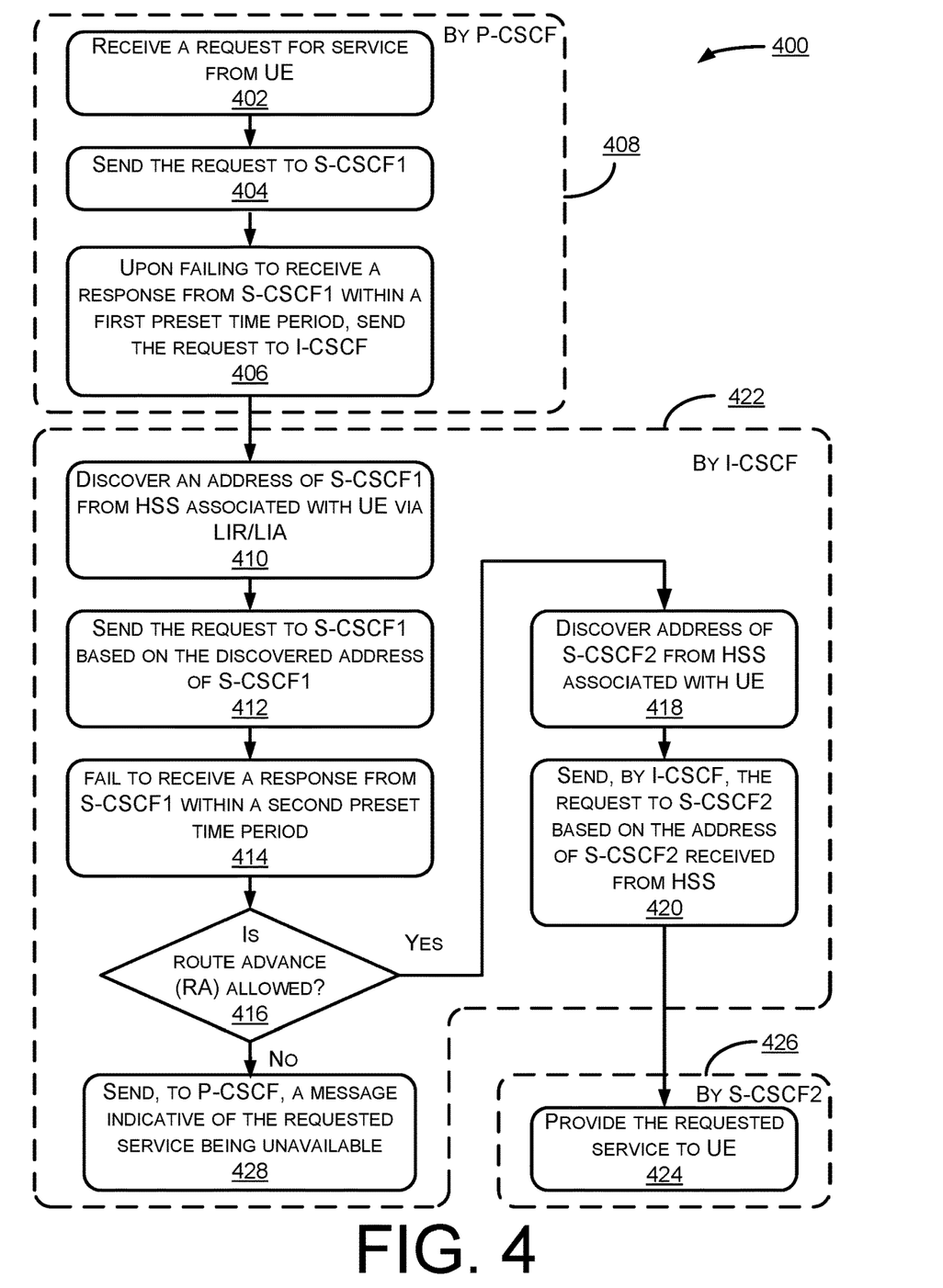
FIG. 4 illustrates another example process in the cellular communication network for managing a requested service when an assigned S-CSCF fails to respond to a request.

FIG. 4 illustrates another example process 400 in the cellular communication network 100 for managing a requested service when a first, or an assigned, S-CSCF fails to respond to a request.

At block 402, the P-CSCF 104 may receive a request, which may be in a form of a SIP INVITE message, for service from the UE 102. The INVITE may be associated with one of multimedia telephony (MMTEL), short message session initiation protocol (SMSIP), the UE 102 being on 5G access or 3G access type, or subscription for the UE 102 as indicated by a feature tag. At block 404, in response to receiving the INVITE, the P-CSCF 104 may send, or forward, the INVITE to the S-CSCF1 108, which is the assigned S-CSCF, i.e., the first S-CSCF for the P-CSCF 104 to contact in response to receiving the INVITE from the UE 102 irrespective of whether the UE is associated with a HSS that supports a custom RA logic. In a normal situation, the S-CSCF1 108 may send a response back to the P-CSCF 104, however, if the S-CSCF1 108 were experiencing some issues internally and unable to respond or externally and did not receive the INVITE, the S-CSCF1 108 may not, or may not be able to, respond to the INVITE. At block 406, upon failing to receive a response from the S-CSCF1 108 within a first preset time period, the P-CSCF 104 may send the INVITE to the I-CSCF 106. As described above and shown as a dotted line 408, blocks 402, 404, and 406 may substantially be performed by the P-CSCF 104.

At block 410, the I-CSCF 106 may receive the INVITE from the P-CSCF 104 and may initiate LIR/LIA messages between the I-CSCF 106 and the associated HSS, which may be either HSS1 112 or HSS2 114, to discover an address of the assigned S-CSCF, i.e., the S-CSCF1 108. At block 412, the I-CSCF 106 may send the INVITE to the S-CSCF1 108 based on the discovered address of the S-CSCF1 108. Upon failing to receive a response from the S-CSCF1 108 within a second preset time period at block 414, the I-CSCF 106 may determine whether a route advance (RA) is allowed or supported based on a custom RA logic at block 416. The I-CSCF 106 may initiate LIR/LIA messages between the I-CSCF 106 and the associated HSS 112 based on a custom RA logic. The LIR/LIA messages may include a reassignment pending flag and a request type as "Registration and Capability" that indicates to the HSS1 112 that the HSS1 112 has to return the mandatory capabilities, and not the assigned S-CSCF, i.e., the HSS1 112 is to return S-CSCF2 110 information in this example, indicating that the RA is supported. The HSS1 112 may then respond with mandatory capabilities based on the I-CSCF 106 performing full qualified domain name (FQDN) resolution to determine another S-CSCF, which is the S-CSCF2 110 in this example, at block 418. Based on the address of the S-CSCF2 110 determined at 418, which may be in a form of an FQDN associated with the S-CSCF2 110, the I-CSCF 106 may send the INVITE to the S-CSCF2 110 at block 420. As described above and shown as a dotted line 422, blocks 410, 412, 414, 416, 415, and 420 may substantially be performed by the I-CSCF 106.

At block 424, the S-CSCF2 110 may communicate with the HSS1 112 utilizing a service assignment request (SAR) and a service assignment answer (SAA) indicating that the S-CSCF2 110 is now serving the UE 102, and download a user profile associated with the UE 102 from the HSS1 112. The S-CSCF2 110 may send an SAR with assignment type as No_Assignment requesting the data of the user initial filter criteria (iFCs) from the HSS1 112, and the HSS1 112 may replace the assigned S-CSCF, the S-CSCF1 108 as the S-CSCF2 110 for the UE 102 and respond with the iFC. As described above and shown as a dotted line 426, block 220 may substantially be performed by the S-CSCF2 110.

At block 416, if the I-CSCF 106 determines that the RA is not allowed or supported as described above, then the I-CSCF 106 may send the 480 SIP message to the P-CSCF 104 at block 428. The I-CSCF 106 may determine that the RA is not allowed or supported based on the information learned from the HSS1 112 via LIR/LIA messages and a feature tag indicative of service, access, method, or Cx realm type associated with the INVITE. Instead of returning the mandatory capabilities with an alternative S-CSCF, i.e., the S-CSCF2 110, the HSS1 112, or HSS2 114, may return the assigned S-CSCF, in this example, the assigned S-CSCF is the S-CSCF1 108, indicating that the RA is not supported.

Figure 5:
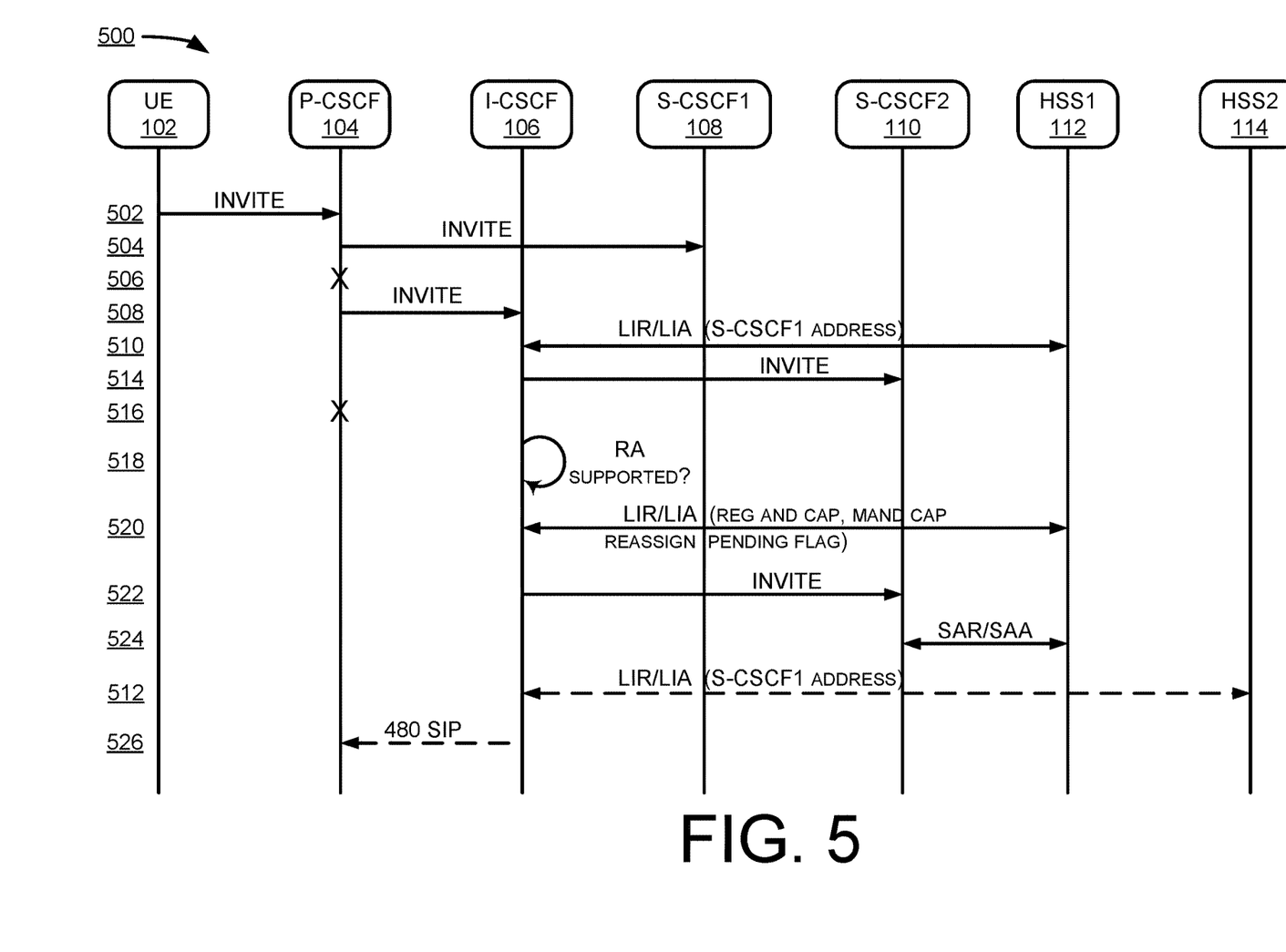
FIG. 5 illustrates another example communication sequence diagram for managing a requested service when a first, or an assigned, S-CSCF fails to respond to a request in the cellular communication network.

FIG. 5 is a communication sequence diagram 500 illustrating an example communication sequence for managing a requested service when a first, or an assigned, S-CSCF 108 fails to respond to a request in the cellular communication network 100.

In FIG. 5, communicating components or entities are listed along the top, with a corresponding vertical line extending downward. Communications are indicated by arrows that extend horizontally from and to the vertical lines corresponding to the entities from that originate and receive the communications. Communications occur in order from top to bottom. An individual communication or set of communications is indicated by a corresponding reference numeral along the left side of the figure, horizontally aligned with the arrow or arrows representing the communication. FIG. 5 illustrates the most relevant communications and may omit other communications that occur in practice but are less relevant to the topics at hand. Such other communications may include communications that both precede and follow the illustrated communications, communications that occur in time between the illustrated communications, and communications that occur between components or entities that are not specifically shown.

At 502, the P-CSCF 104 may receive a request, which may be in a form of a SIP INVITE message, for service from the UE 102. The INVITE may be associated with one of multimedia telephony (MMTEL), short message session initiation protocol (SMSIP), the UE 102 being on 5G access or 3G access type, or subscription for the UE 102 as indicated by a feature tag. At 504, in response to receiving the INVITE, the P-CSCF 104 may send, or forward, the INVITE to the S-CSCF1 108, which is the assigned S-CSCF, i.e., the first S-CSCF for the P-CSCF 104 to contact in response to receiving the INVITE from the UE 102 irrespective of whether the UE is associated with a HSS that supports a custom RA logic. In a normal situation, the S-CSCF1 108 may send a response back to the P-CSCF 104, however, if the S-CSCF1 108 were experiencing some issues internally and unable to respond or externally and did not receive the INVITE, the S-CSCF1 108 may not, or may not be able to, respond to the INVITE. At 506, a first preset time period within which the P-CSCF 104 is expected to receive a response from the S-CSCF1 108 is shown to have expired, and the P-CSCF 104 may send the INVITE to the I-CSCF 106 at 508.

At 510, in response to receiving the INVITE from the P-CSCF 104, the I-CSCF 106 may initiate LIR/LIA messages between the I-CSCF 106 and the associated HSS, which may be either HSS1 112 or HSS2 114 (shown as dotted line 512), to discover an address of the assigned S-CSCF, i.e., the S-CSCF1 108. At 514, the I-CSCF 106 may send the INVITE to the S-CSCF1 108 based on the discovered address of the S-CSCF1 108. Upon failing to receive a response from the S-CSCF1 108 within a second preset time period at 516, the I-CSCF 106 may determine whether a route advance (RA) is allowed or supported based on a custom RA logic at 518. The I-CSCF 106 may initiate LIR/LIA messages between the I-CSCF 106 and the associated HSS 112 based on a custom RA logic. The LIR/LIA messages may include a reassignment pending flag and a request type as "Registration and Capability" that indicates to the HSS1 112 that the HSS1 112 has to return the mandatory capabilities, and not the assigned S-CSCF, i.e., the HSS1 112 is to return S-CSCF2 110 information in this example, indicating that the RA is supported. The HSS1 112 may then respond with mandatory capabilities based on the I-CSCF 106 performing full qualified domain name (FQDN) resolution to determine another S-CSCF, which is the S-CSCF2 110 in this example, at 520. Based on the address of the S-CSCF2 110 determined at 520, which may be in a form of an FQDN associated with the S-CSCF2 110, the I-CSCF 106 may send the INVITE to the S-CSCF2 110 at 522.

At 524, the S-CSCF2 110 may communicate with the HSS1 112 utilizing a service assignment request (SAR) and a service assignment answer (SAA) indicating that the S-CSCF2 110 is now serving the UE 102, and download a user profile associated with the UE 102 from the HSS1 112. The S-CSCF2 110 may send an SAR with assignment type as No_Assignment requesting the data of the user initial filter criteria (iFCs) from the HSS1 112, and the HSS1 112 may replace the assigned S-CSCF, the S-CSCF1 108 as the S-CSCF2 110 for the UE 102 and respond with the iFC.

At 518, if the I-CSCF 106 determines that the RA is not allowed or supported as described above, then the I-CSCF 106 may send the 480 SIP message to the P-CSCF 104 at 526. The I-CSCF 106 may determine that the RA is not allowed or supported based on the information learned from the HSS1 112 via LIR/LIA messages and a feature tag indicative of service, access, method, or Cx realm type associated with the INVITE. Instead of returning the mandatory capabilities with an alternative S-CSCF, i.e., the S-CSCF2 110, the HSS1 112, or HSS2 114, may return the assigned S-CSCF, in this example, the assigned S-CSCF is the S-CSCF1 108, indicating that the RA is not supported.

Figure 6:
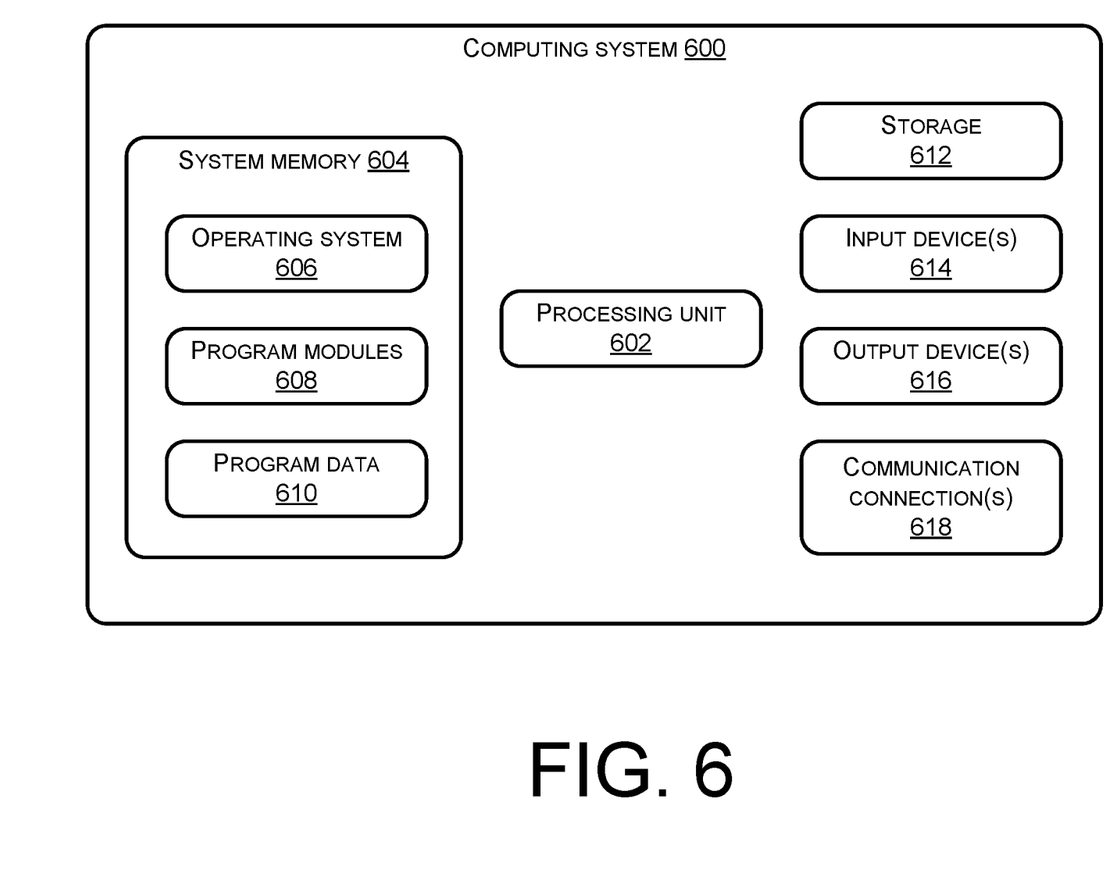
FIG. 6 is an example block diagram of a computing system used to implement various components of the cellular communication network.

FIG. 6 is an example block diagram of a computing system 600 such as may be used to implement various components discussed above, such as components of the cellular communication network 100. For example, one or more computing systems 600 may be configured or programmed to implement all or part of any one of the P-CSCF 104, the I-CSCF 106, the S-CSCF1 108, the S-CSCF2 110, the HSS1 112, and the HSS2 114, as well as other components of the cellular communication network 100 that are not specifically shown or discussed.

In various embodiments, the computing system 600 may include at least one processing unit 602 and system memory 604. Depending on the exact configuration and type of the computing system 600, the system memory 604 may be volatile (such as RAM), non-volatile (such as ROM, flash memory, etc.) or some combination of both. The system memory 604 may include an operating system 606, one or more program modules 608, and may include program data 610.

The computing system 600 may also include additional data storage devices (removable and/or non-removable) such as, for example, magnetic disks, optical disks, or tape. Such additional storage is illustrated in FIG. 6 by storage 612.

Non-transitory computer storage media of the computing system 600 may include volatile and nonvolatile, removable and non-removable media implemented in any method or technology for storage of information, such as computer readable instructions, data structures, program modules, or other data. The system memory 604 and storage 612 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 600. Any such non-transitory computer-readable storage media may be part of the computing system 600.

In various embodiment, any or all of the system memory 604 and storage 612 may store programming instructions which, when executed, implement some or all of the function functionality described above as being implemented by components of the cellular communication network 100.

The computing system 600 may also have input device(s) 614 such as a keyboard, a mouse, a touch-sensitive display, voice input device, etc. Output device(s) 616 such as a display, speakers, a printer, etc. may also be included. The computing system 600 may also contain communication connections 618 that allow the device to communicate with other computing systems.

Although features and/or methodological acts are described above, it is to be understood that the appended claims are not necessarily limited to those features or acts. Rather, the features and acts described above are disclosed as example forms of implementing the claims.

EXAMPLE CLAUSES

A. A method comprising: receiving, by a proxy call session control function (P-CSCF), a request for service from a user equipment (UE) associated with a home subscriber server (HSS) of a plurality of HSSs; sending, by the P-CSCF, the request to a first serving CSCF (S-CSCF1) associated with the UE; upon failing to receive, by the P-CSCF, a response from the S-CSCF1 within a preset time period, sending the request to an interrogating CSCF (I-CSCF); and based on information included in the request, performing, by the I-CSCF, one of: discovering an address of a second S-CSCF (S-CSCF2) from the associated HSS and sending the request to the S-CSCF2 based on the discovered address of the S-CSCF2, or sending, to the P-CSCF, a message indicative of the requested service being unavailable.

B. The method as paragraph A recites, wherein discovering, by the I-CSCF, the address of the S-CSCF2 from the associated HSS comprises: determining that the information included in the request comprises a route advance (RA) flag; determining that a feature tag associated with the request is consistent with a custom RA logic associated with the RA flag; and initiating a location-info-request (LIR) and a location-info-answer (LIA) messages between the I-CSCF and the associated HSS based on the custom RA logic associated with the RA flag.

C. The method as paragraph B recites, wherein: the LIA message includes a request for registration and capabilities and a reassignment pending flag, and the LIR message includes mandatory capabilities associated with the UE.

D. The method as paragraph C recites, wherein discovering the address of the S-CSCF2 from the associated HSS comprises: providing, by the associated HSS, address information of the S-CSCF2 as the mandatory capabilities.

E. The method as paragraph D recites, wherein the address of the S-CSCF2 comprises a full qualified domain name (FQDN) associated with the S-CSCF2.

F. The method as paragraph E recites, wherein discovering the address of the S-CSCF2 comprises performing, by the I-CSCF, an FQDN resolution based on the mandatory capabilities to determine the S-CSCF2.

G. The method as paragraph B recites, wherein the request for service includes a feature tag indicating a custom route advance (RA) logic per one of: SIP method, access type, service type, or Cx realm.

H. The method as paragraph A recites, wherein the information included in the request, based on which the I-CSCF sends to the P-CSCF the message indicative of the requested service being unavailable, includes at least one of: the information lacking a route advance (RA) flag, a feature tag associated with the request, or the HSS associated with the UE not supporting a custom RA logic.

I. The method as paragraph H recites, wherein the HSS associated with the UE not supporting the custom RA logic is based on: initiating, by the I-CSCF, a location-info-request (LIR) and a location-info-answer (LIA) messages between the I-CSCF and the associated HSS; and receiving, by the I-CSCF from the associated HSS, address information of the S-CSCF1 as the assigned S-SCSF.

J. A computing system comprising: one or more processors; and one or more non-transitory computer-readable media storing computer-executable instructions that, when executed by the one or more processors, cause the one or more processors to perform actions comprising: receiving, by a proxy call session control function (P-CSCF), a request for service from a user equipment (UE) associated with a home subscriber server (HSS) of a plurality of HSSs; sending, by the P-CSCF, the request to a first serving CSCF (S-CSCF1) associated with the UE; upon failing to receive, by the P-CSCF, a response from the S-CSCF1 within a preset time period, sending the request to an interrogating CSCF (I-CSCF); and based on information included in the request, performing, by the I-CSCF, one of: discovering an address of a second S-CSCF (S-CSCF2) from the associated HSS and sending the request to the S-CSCF2 based on the discovered address of the S-CSCF2, or sending, to the P-CSCF, a message indicative of the requested service being unavailable.

K. The computing system as paragraph J recites, wherein discovering, by the I-CSCF, the address of the S-CSCF2 from the associated HSS comprises: determining that the information included in the request comprises a route advance (RA) flag; determining that a feature tag associated with the request is consistent with a custom RA logic associated with the RA flag; and initiating a location-info-request (LIR) and a location-info-answer (LIA) messages between the I-CSCF and the associated HSS based on the custom RA logic associated with the RA flag.

L. The computing system as paragraph K recites, wherein: the LIA message includes a request for registration and capabilities and a reassignment pending flag, and the LIR message the LIR message includes mandatory capabilities associated with the UE.

M. The computing system as paragraph L recites, wherein discovering the address of the S-CSCF2 from the associated HSS comprises: providing, by the associated HSS, address information of the S-CSCF2 as the mandatory capabilities.

N. The computing system as paragraph M recites, wherein: the address of the S-CSCF2 comprises a full qualified domain name (FQDN) associated with the S-CSCF2, and discovering the address of the S-CSCF2 comprises performing, by the I-CSCF, an FQDN resolution based on the mandatory capabilities to determine the S-CSCF2.

O. The computing system as paragraph K recites, wherein the feature tag indicates the custom RA logic per one of: SIP method, access type, service type, or Cx realm.

P. One or more non-transitory computer-readable media storing computer-executable instructions that, when executed by one or more processors, cause the one or more processors to perform actions comprising: receiving, by a proxy call session control function (P-CSCF), a request for service from a user equipment (UE) associated with a home subscriber server (HSS) of a plurality of HSSs; sending, by the P-CSCF, the request to a first serving CSCF (S-CSCF1) associated with the UE; upon failing to receive, by the P-CSCF, a response from the S-CSCF1 within a preset time period, sending the request to an interrogating CSCF (I-CSCF); and based on information included in the request, performing, by the I-CSCF, one of: discovering an address of a second S-CSCF (S-CSCF2) from the associated HSS and sending the request to the S-CSCF2 based on the discovered address of the S-CSCF2, or sending, to the P-CSCF, a message indicative of the requested service being unavailable.

Q. The one or more non-transitory computer-readable media as paragraph P recites, wherein discovering, by the I-CSCF, the address of the S-CSCF2 from the associated HSS comprises: determining that the information included in the request comprises a route advance (RA) flag; determining that a feature tag associated with the request is consistent with a custom RA logic associated with the RA flag; and initiating a location-info-request (LIR) and a location-info-answer (LIA) messages between the I-CSCF and the associated HSS based on the custom RA logic associated with the RA flag.

R. The one or more non-transitory computer-readable media as paragraph Q recites, wherein: the LIA message includes a request for registration and capabilities and a reassignment pending flag, and the LIR message includes mandatory capabilities associated with the UE.

S. The one or more non-transitory computer-readable media as paragraph R recites, wherein the address of the S-CSCF2 comprises a full qualified domain name (FQDN) associated with the S-CSCF2, and discovering the address of the S-CSCF2 comprises performing, by the I-CSCF, an FQDN resolution based on the mandatory capabilities to determine the S-CSCF2.

T. The one or more non-transitory computer-readable media as paragraph Q recites, wherein the feature tag indicates the custom RA logic per one of: SIP method, access type, service type, or Cx realm.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving, by a proxy call session control function (P-CSCF), a request for service from a user equipment (UE) associated with a home subscriber server (HSS) of a plurality of HSSs;
sending, by the P-CSCF, the request to an assigned serving CSCF (S-CSCF1) associated with the UE;
upon failing to receive, by the P-CSCF, a response from the S-CSCF1 within a preset time period, sending the request to an interrogating CSCF (I-CSCF); and
based on information included in the request, performing, by the I-CSCF, one of:
  discovering an address of a second S-CSCF (S-CSCF2) from the associated HSS and sending the request to the S-CSCF2 based on the discovered address of the S-CSCF2, or
  sending, to the P-CSCF, a message indicative of the requested service being unavailable,
wherein the information indicates whether the HSS associated with the UE supports custom route advance (RA) logic, and the I-CSCF performs the discovering when the HSS supports the custom RA logic and performs the sending when the HSS does not support the custom RA logic.

2. The method of claim 1, wherein discovering, by the I-CSCF, the address of the S-CSCF2 from the associated HSS comprises:
  determining that the information included in the request comprises a RA flag;
  determining that a feature tag associated with the request is consistent with the custom RA logic, the custom RA logic being associated with the RA flag; and
  initiating a location-info-request (LIR) and a location-info-answer (LIA) messages between the I-CSCF and the associated HSS based on the custom RA logic associated with the RA flag.

3. The method of claim 2, wherein:
  the LIA message includes a request for registration and capabilities and a reassignment pending flag, and
  the LIR message includes mandatory capabilities associated with the UE.

4. The method of claim 3, wherein discovering the address of the S-CSCF2 from the associated HSS comprises:
  providing, by the associated HSS, address information of the S-CSCF2 as the mandatory capabilities.

5. The method of claim 4, wherein the address of the S-CSCF2 comprises a full qualified domain name (FQDN) associated with the S-CSCF2.

6. The method of claim 5, wherein discovering the address of the S-CSCF2 comprises:
  performing, by the I-CSCF, an FQDN resolution based on the mandatory capabilities to determine the S-CSCF2.

7. The method of claim 2, wherein the feature tag indicates the custom RA logic per one of:
  SIP method,
  access type,
  service type, or
  Cx realm.

8. The method of claim 1, wherein the information included in the request, based on which the I-CSCF sends to the P-CSCF the message indicative of the requested service being unavailable, includes at least one of:
  the information lacking a RA flag, or
  a feature tag associated with the request.

9. The method of claim 1, wherein the HSS associated with the UE not supporting the custom RA logic is based on:
  initiating, by the I-CSCF, a location-info-request (LIR) and a location-info-answer (LIA) messages between the I-CSCF and the associated HSS; and
  receiving, by the I-CSCF from the associated HSS, address information of the S-CSCF1 as the assigned S-SCSF.

10. A computing system comprising:
  one or more processors; and
  one or more non-transitory computer-readable media storing computer-executable instructions that, when executed by the one or more processors, cause the one or more processors to perform actions comprising:
    receiving, by a proxy call session control function (P-CSCF), a request for service from a user equipment (UE) associated with a home subscriber server (HSS) of a plurality of HSSs;
    sending, by the P-CSCF, the request to an assigned serving CSCF (S-CSCF1) associated with the UE;
    upon failing to receive, by the P-CSCF, a response from the S-CSCF1 within a preset time period, sending the request to an interrogating CSCF (I-CSCF); and
    based on information included in the request, performing, by the I-CSCF, one of:
      discovering an address of a second S-CSCF (S-CSCF2) from the associated HSS and sending the request to the S-CSCF2 based on the discovered address of the S-CSCF2, or
      sending, to the P-CSCF, a message indicative of the requested service being unavailable,
    wherein the information indicates whether the HSS associated with the UE supports custom route advance (RA) logic, and the I-CSCF performs the discovering when the HSS supports the custom RA logic and performs the sending when the HSS does not support the custom RA logic.

11. The computing system of claim 10, wherein discovering, by the I-CSCF, the address of the S-CSCF2 from the associated HSS comprises:
  determining that the information included in the request comprises a RA route flag;
  determining that a feature tag associated with the request is consistent with the custom RA logic associated with the RA flag; and
  initiating a location-info-request (LIR) and a location-info-answer (LIA) messages between the I-CSCF and the associated HSS based on the custom RA logic, the custom RA logic being associated with the RA flag.

12. The computing system of claim 11, wherein:
  the LIA message includes a request for registration and capabilities and a reassignment pending flag, and
  the LIR message includes mandatory capabilities associated with the UE.

13. The computing system of claim 12, wherein discovering the address of the S-CSCF2 from the associated HSS comprises:
  providing, by the associated HSS, address information of the S-CSCF2 as the mandatory capabilities.

14. The computing system of claim 13, wherein:
  the address of the S-CSCF2 comprises a full qualified domain name (FQDN) associated with the S-CSCF2, and
  discovering the address of the S-CSCF2 comprises performing, by the I-CSCF, an FQDN resolution based on the mandatory capabilities to determine the S-CSCF2.

15. The computing system of claim 11, wherein the feature tag indicates the custom RA logic per one of:
  SIP method,
  access type,
  service type, or
  Cx realm.

16. One or more non-transitory computer-readable media storing computer-executable instructions that, when executed by one or more processors, cause the one or more processors to perform actions comprising:
  receiving, by a proxy call session control function (P-CSCF), a request for service from a user equipment (UE) associated with a home subscriber server (HSS) of a plurality of HSSs;
  sending, by the P-CSCF, the request to a first serving CSCF (S-CSCF1) associated with the UE;
  upon failing to receive, by the P-CSCF, a response from the S-CSCF1 within a preset time period, sending the request to an interrogating CSCF (I-CSCF); and
  based on information included in the request, performing, by the I-CSCF, one of:
    discovering an address of a second S-CSCF (S-CSCF2) from the associated HSS and sending the request to the S-CSCF2 based on the discovered address of the S-CSCF2, or
    sending, to the P-CSCF, a message indicative of the requested service being unavailable, wherein the information indicates whether the HSS associated with the UE supports custom route advance (RA) logic, and the I-CSCF performs the discovering when the HSS supports the custom RA logic and performs the sending when the HSS does not support the custom RA logic.

17. The one or more non-transitory computer-readable media of claim 16, wherein discovering, by the I-CSCF, the address of the S-CSCF2 from the associated HSS comprises:
   determining that the information included in the request comprises a RA flag;
   determining that a feature tag associated with the request is consistent with the custom RA logic, the custom RA logic being associated with the RA flag; and
   initiating a location-info-request (LIR) and a location-info-answer (LIA) messages between the I-CSCF and the associated HSS based on the custom RA logic associated with the RA flag.

18. The one or more non-transitory computer-readable media of claim 17, wherein:
   the LIA message includes a request for registration and capabilities and a reassignment pending flag, and
   the LIR message includes mandatory capabilities associated with the UE.

19. The one or more non-transitory computer-readable media of claim 18, wherein:
   the address of the S-CSCF2 comprises a full qualified domain name (FQDN) associated with the S-CSCF2, and
   discovering the address of the S-CSCF2 comprises performing, by the I-CSCF, an FQDN resolution based on the mandatory capabilities to determine the S-CSCF2.

20. The one or more non-transitory computer-readable media of claim 17, wherein the feature tag indicates the custom RA logic per one of:
   SIP method,
   access type,
   service type, or
   Cx realm.

\* \* \* \* \*